United States Patent [19]

Antonov et al.

[11] Patent Number: 4,496,870

[45] Date of Patent: Jan. 29, 1985

[54] ARRANGEMENT FOR SUPPORTING STATOR END WINDINGS OF AN ELECTRICAL MACHINE

[75] Inventors: Jury F. Antonov; Vadim I. Iogansen; Alexei S. Tkachenko; Vladimir P. Chernyavsky; Aron B. Shapiro, all of Leningrad, U.S.S.R.

[73] Assignee: Leningradskoe Proizvodstvennoe Elektromachinostroitelnoe Obiedinenie "Elektrosila", Leningrad, U.S.S.R.

[21] Appl. No.: 459,577

[22] PCT Filed: May 26, 1981

[86] PCT No.: PCT/SU81/00044

§ 371 Date: Jan. 6, 1983

§ 102(e) Date: Jan. 6, 1983

[87] PCT Pub. No.: WO82/04362

PCT Pub. Date: Dec. 9, 1982

[51] Int. Cl.³ .............................................. H02K 3/46
[52] U.S. Cl. ...................................... 310/260; 310/51
[58] Field of Search ................... 310/260, 270, 91, 51, 310/42

[56] References Cited

U.S. PATENT DOCUMENTS 3,089,048  5/1963  Bahn .................................. 310/270

FOREIGN PATENT DOCUMENTS

| 1214773 | 4/1966 | Fed. Rep. of Germany | 310/260 |
| 2703365 | 8/1978 | Fed. Rep. of Germany | 310/260 |
| 0413073 | 11/1966 | Switzerland | 310/260 |
| 1539707 | 3/1977 | United Kingdom | 310/260 |
| 0314265 | 9/1971 | U.S.S.R. | 310/260 |
| 0546306 | 2/1977 | U.S.S.R. | 310/260 |

Primary Examiner—R. Skudy
Attorney, Agent, or Firm—Burgess, Ryan & Wayne

[57] ABSTRACT

The arrangement comprises a clamping plate (1) with a projecting portion (2), an insulating ring (3) tightly embracing the end windings (4), resilient strips (5) disposed on the outer surface of the insulating ring (3) and spaced around the periphery thereof, means (6) adapted for pressing the resilient strips (5) against the insulating ring (3) in a radial direction, interposed between the projecting portion (2) of the clamping plate (1) and the resilient strips (5), and being in contact with the projecting portion (2). Disposed in clearances between the resilient strips (5) are resilient members (9) which are in contact with the projecting portion (2) and the insulating ring (3) and provided with locking elements (12) adapted to prevent the resilient members (9) from axial displacement.

3 Claims, 4 Drawing Figures

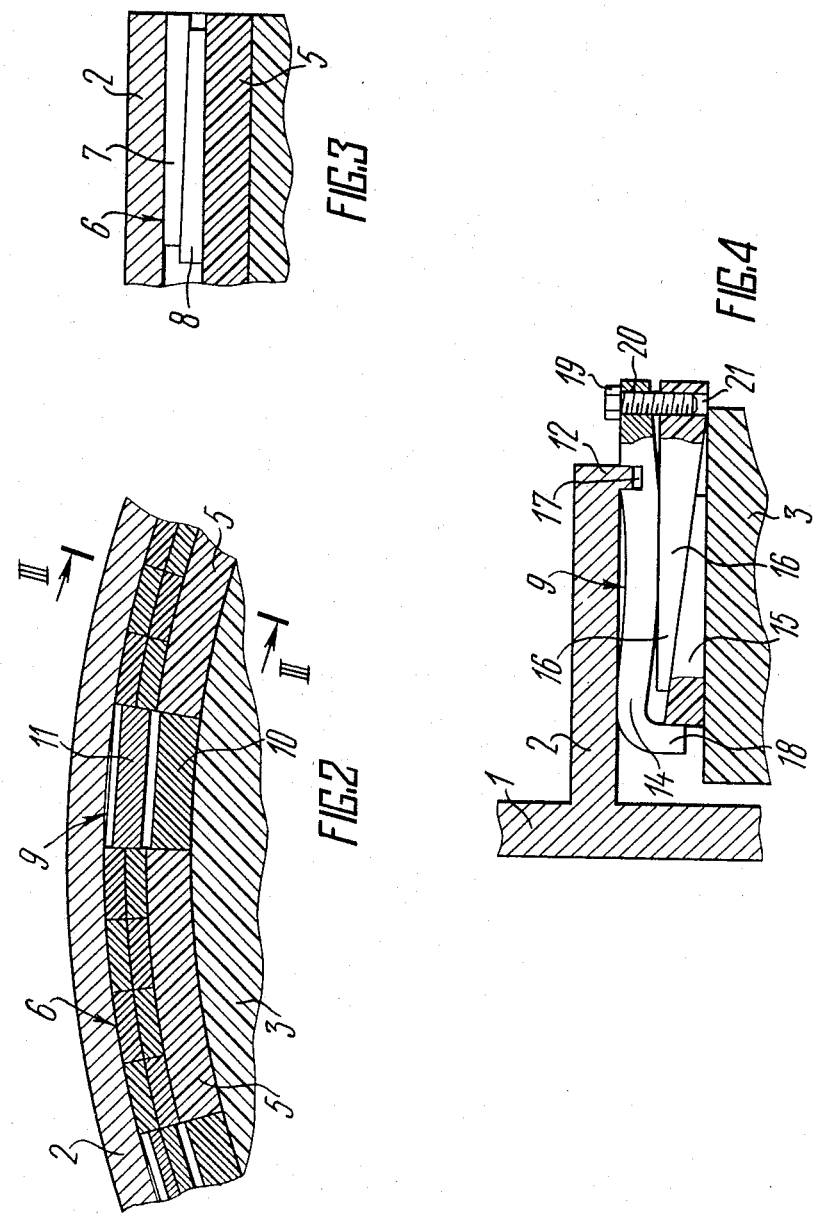

ARRANGEMENT FOR SUPPORTING STATOR END WINDINGS OF AN ELECTRICAL MACHINE

FIELD OF THE INVENTION

The present invention relates generally to the field of electrical machine engineering and, more particularly, to arrangements for supporting stator end windings of electrical machines.

The invention can most advantageously be used in high-power turbogenerators.

DESCRIPTION OF THE PRIOR ART

Supporting of the stator end windings of a high-power electrical machine is one of the most severe problems of current electrical machine engineering, since such end windings operate under unfavorable conditions of strong and variable electromagnetic forces and thermal strain.

The main damage factor for the stator end windings is electromagnetic forces which give rise to vibrations of the end windings, resulting in damage of the soldered winding joints as well as in abrasion of its insulation, and in damage of the copper conductors due to fatigue.

In order to provide a substantial increase in the support reliability of the stator end windings, it is necessary to achieve a minimum level of vibrations of the end windings, while keeping a possibility of their axial displacement under thermal strain.

Known in the prior art is an arrangement for supporting stator end windings of an electrical machine, disclosed in the FRG Pat. No. 1,214,773, Cl.21 $d^1$, 54, published 1963. This arrangement comprises a clamping plate having a projecting portion, and an insulating ring tightly embracing the end windings. The projecting portion comprises a number of brackets fitted with guides, disposed around the outer periphery of the insulating ring, and embracing the latter, the insulating ring together with the end windings being capable of moving along the bracket guides in an axial direction under thermal strain of the electrical machine stator winding.

However, in the course of the electrical machine operation, clearances between the insulating ring and the bracket guides inevitably occur as a result of different thermal strain of its structural elements, whereby rigid connection between the insulating ring and the brackets is lost. This gives rise to an increased level of vibration of the end windings, thereby decreasing the support reliability of vibration of the end windings.

There is also known an arrangement for supporting stator end windings of an electrical machine (cf. the British Patent No. 1,539,707, Int. Cl. H02K 3/50, published 1979), which comprises a clamping plate with a projecting portion, an insulating ring tightly embracing the end windings, resilient strips disposed on the outer surface of the insulating ring and spaced around the periphery thereof. Arranged between the projecting portion of the clamping plate and the resilient strips are means adapted for pressing the resilient strips against the insulating ring in a radial direction and being in contact with the projecting portion.

The resilient strips are made of rubber exhibiting a high rigidity in a radial direction. Due to a low shear modulus of the rubber, the resilient strips features a low rigidity in axial and tangential directions. This makes it possible to provide an axial displacement of the insulating ring together with the end windings relative to the projection portion of the clamping plate under thermal expansion of the stator winding.

Again, the provision of the resilient strips as well as the means for pressing them against the insulating ring makes it possible to eliminate clearances between the insulating ring and the projecting portion of the clamping plate, as a result of which the support reliability of the stator end windings is increased as compared with the arrangement described hereinabove.

However, because of a low shear modulus of the rubber used, the resilient strips fail to prevent the insulating ring from axial and tangential displacements relative to the projecting portion of the clamping plate, caused by variable electromagnetic forces induced by electric current in the stator end windings, and the result is an increased level of vibrations of the end windings in the axial and tangential directions, which, in turn, results in the loss of support reliability.

SUMMARY OF THE INVENTION

The principal object of the present invention is to provide an arrangement for supporting stator end windings of an electrical machine, which is provided with structural elements which make it possible to prevent the insulating ring together with the stator end windings from axial and tangential displacements relative to the projecting portion of the clamping plate under the action of variable electromagnetic forces developed in the electrical machine stator winding.

With this principal object in view, there is provided an arrangement for supporting stator end windings of an electrical machine, comprising a clamping plate with a projecting portion, an insulating ring tightly embracing the end windings, resilient strips disposed on the outer surface of the insulating ring and spaced around the periphery thereof, and means adapted for pressing the resilient strips against the insulating ring in a radial direction, said means being interposed between the projecting portion of the clamping plate and the resilient strips and being in contact with said projecting portion, wherein, according to the invention, disposed in clearances between the resilient strips are resilient members being in contact with the projecting portion and with the insulating ring, and provided with locking elements to prevent the resilient members from axial displacement.

The resilient members with the locking elements give rise, due to elastic forces developed by said resilient members, to frictional forces developed between the projecting portion of the clamping plate and the resilient members, as well as between the insulating ring and said members. Such frictional forces prevent the insulating ring from axial displacement relative to the projecting portion of the clamping plate. The elastic force can be chosen so that the frictional forces fail to prevent the insulating ring together with the stator end windings from axial displacement in case of their thermal expansion, but prevent them from their axial and tangential displacements under the action of electromagnetic forces induced in the windings. The last can be done with ease, since thermal forces are more than 10 times greater than the electromagnetic forces.

It is advisable that the resilient members comprise a rigid plate disposed on the insulating ring and a resilient ripple-shaped strip bearing with convex portions of its one rippled surface up against the rigid plate and with convex portions of its other rippled surface up against the projecting portion of the clamping plate, and the locking element be made in the form of a plate having its one end rigidly secured to the clamping plate, and being in contact with the rigid plate and the resilient strip.

Such a resilient member as well as the locking member is easy in manufacture and can be readily installed in the proposed supporting arrangement.

It is also advisable that the resilient member comprise a resilient arc-shaped plate whose concave surface is in contact with the projecting portion of the clamping plate and which is provided with a slot on the side of its concave surface and with a projection on its convex surface, and two wedges being in contact with their operating faces, pointed towards each other and interposed between the convex surface of the resilient plate and the insulating ring, the wedge adjoining the insulating ring bearing up against the projection of the resilient plate, the wedge adjoining the convex surface of the resilient plate being rigidly secured thereto, and the locking element be an annular projection made integrally with the projecting portion and entering the slot of the resilient plate.

Although such a resilient member is more complex in design, the wedges provided therein allow to use the resilient plate of significantly higher stiffness, thus ensuring increased values of frictional forces developed between the resilient member and the projecting portion, and between the resilient member and the insulating ring.

BRIEF DESCRIPTION OF THE DRAWINGS

The invention will be better understood by reference to the following description of illustrated embodiments of the invention, taken in conjunction with the accompanying drawings, wherein:

FIG. 2 is a sectional view taken along the line II—II of FIG. 1;

FIG. 3 is a sectional view taken along the line III—III of FIG. 2, and

FIG. 4 is a sectional view of an arrangement for supporting stator end windings of an electrical machine, embodying another form of the present invention.

BEST MODE TO CARRY OUT THE INVENTION

Figure 1:
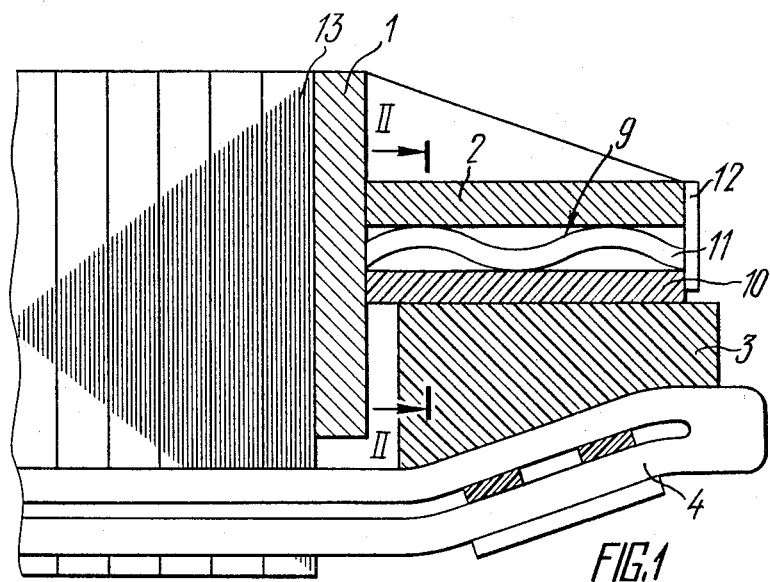
FIG. 1 is a sectional view of an arrangement for supporting stator end windings of an electrical machine, embodying one form of the present invention.

The arrangement for supporting stator end windings of an electrical machine comprises a clamping plate 1 (FIG. 1) with a projecting portion 2, and an insulating ring 3 tightly embracing with its inner conical surface stator end windings 4.

The projecting portion 2 is a hollow cylinder (FIG. 2) with the insulating ring 3 mounted therein. Disposed on the outer surface of the insulating ring 3 are resilient strips 5 made of rubber and spaced around the periphery thereof. Provided between the inner surface of the projecting portion 2 and each of the resilient strips 5 are a number of means 6 comprising each two wedges 7 and 8 (FIG. 3) contacting each other with their operating faces and pointed towards each other, the wedge 7 being in contact with the inner surface of the projecting portion 2, and the wedge 8, with the resilient strip 5. The locking of the resilient strip 5 against the insulating ring 3 is achieved through moving the wedge 7 relative to the wedge 8.

Mounted in the clearances provided between the resilient strips 5 (FIG. 2) are resilient members 9 comprising each a rigid plate 10 disposed directly on the insulating ring 3 and a resilient ripple-shaped strip 11 disposed on the rigid plate 10, the resilient strip 11 being made of a non-magnetic material, e.g. non-magnetic steel. Each of the resilient members 9 is provided with a locking element 12 which is a rigid plate having its one end connected with the projecting portion 2. The resilient strip 11 as well as the rigid plate 10 of each resilient member 9 bears up against the locking element 12 and the clamping plate 1, the latter being associated with the electrical machine stator core 13.

In operation of the electrical machine, the stator end windings 4 are subjected to the action of significant variable electromagnetic forces causing vibrations of the end windings 4 together with the insulating ring 3.

However, the resilient member 9, due to frictional forces, prevent the stator end windings 4 together with the insulating ring 3 from tangential and axial displacements relative to the projecting portion 2, while the resilient strips 5 in combination with the means 6 prevent them from radial displacement.

According to another embodiment of the present invention, shown in FIG. 4, each of the resilient members 9 comprises an arc-shaped resilient plate 14 and two wedges 15 and 16 interposed between the resilient plate 14 and the insulating ring 3. The resilient plate 14 faces with its convex surface the insulating ring 3 and is provided with a slot 17 made on the side of its concave surface and with a projection 18 on the side of the convex surface thereof.

The wedges 15 and 16 are in contact with their operating faces and are pointed towards each other, the wedge 15 being in contact with the insulating ring 3 and bearing up against the projection 18 of the resilient plate 14, while the wedge 16 is in contact with the convex surface of the resilient plate 14 and rigidly secured thereto by a bolt 19 screwed into threaded holes 20 provided in the resilient plate 14, the bolt 19 extending through a smooth hole 21 in the wedge 16.

Here, the locking element 12 is an annular projection made integrally with the projecting portion 2 and entering the slot 17 of each of the resilient plates 14.

Although the particular embodiments of the invention have been described hereinabove, it will be apparent to those skilled in the art that numerous modifications and other embodiments of the invention may be devised without departing from the true spirit and scope thereof, defined by the following claims.

Commercial Applicability

The arrangement for supporing stator end winding of an electrical machine according to the present invention can most advantageously be used in high-power turbogenerators.

We claim:

1. An arrangement for supporting stator end windings of an electrical machine, comprising a clamping plate operatively associated with the stator core of said machine and having a projecting portion, an insulating ring tightly embracing the end windings, resilient strips disposed on the outer surface of the insulating ring and spaced apart around the periphery thereof, means for pressing the resilient strips against the insulating ring in a radial direction, said pressing means being interposed between the projecting portion of the clamping plate and the resilient strips, and being in contact with said projecting portion, rigid plates extending around the periphery of the insulating ring between the resilient strips (5), and resilient members mounted on respective ones of said rigid plates and provided with locking elements (12) to prevent axial displacement of said resilient members, said resilient members (9) being in contact with the projecting portion (2) of the clamping plate (1), each of said resilient members (9) comprises a rigid plate (10) arranged on the insulating ring (3), and a resilient ripple-shaped strip (11) bearing with convex portions of one rippled surface thereof against the rigid plates (10) and with convex portions of the other rippled surface thereof, against the projecting portion (2).

2. An arrangement as defined in claim 1, wherein at least one of the locking elements (12) being made in the form of a plate having one end rigidly secured to the projecting portion (2) of the clamping plate (1), at least one of said locking elements being in contact with the rigid plate (10) and the resilient strip (11).

3. An arrangement as defined in claim 1, wherein each of said resilient members (9) comprises a resilient arc-shaped plate (14) having a concave surface in contact with the projecting portion (2) of the clamping plate (1) and provided with a slot (17) on the side of said concave surface and a projection (18) on the side of the convex surface of the resilient plate, the resilient member further comprising two wedges (15,16) in contact with each other with their operating faces pointed towards each other and interposed between the convex surface of the resilient arc-shaped plate (14) and the insulating ring (3), the wedge (15) adjoining the insulating ring (3) bearing against the projection (18) of the resilient arc-shaped plate (14), the wedge (16) adjoining the convex surface of the resilient arc-shaped plate (14) being rigidly secured to said plate, at least one of said locking elements being an annular projection integral with the projecting portion (2) and extending into the slot (17) of each said resilient arc-shaped plate (14).

* * * * *